United States Patent Office 3,534,227
Patented Oct. 13, 1970

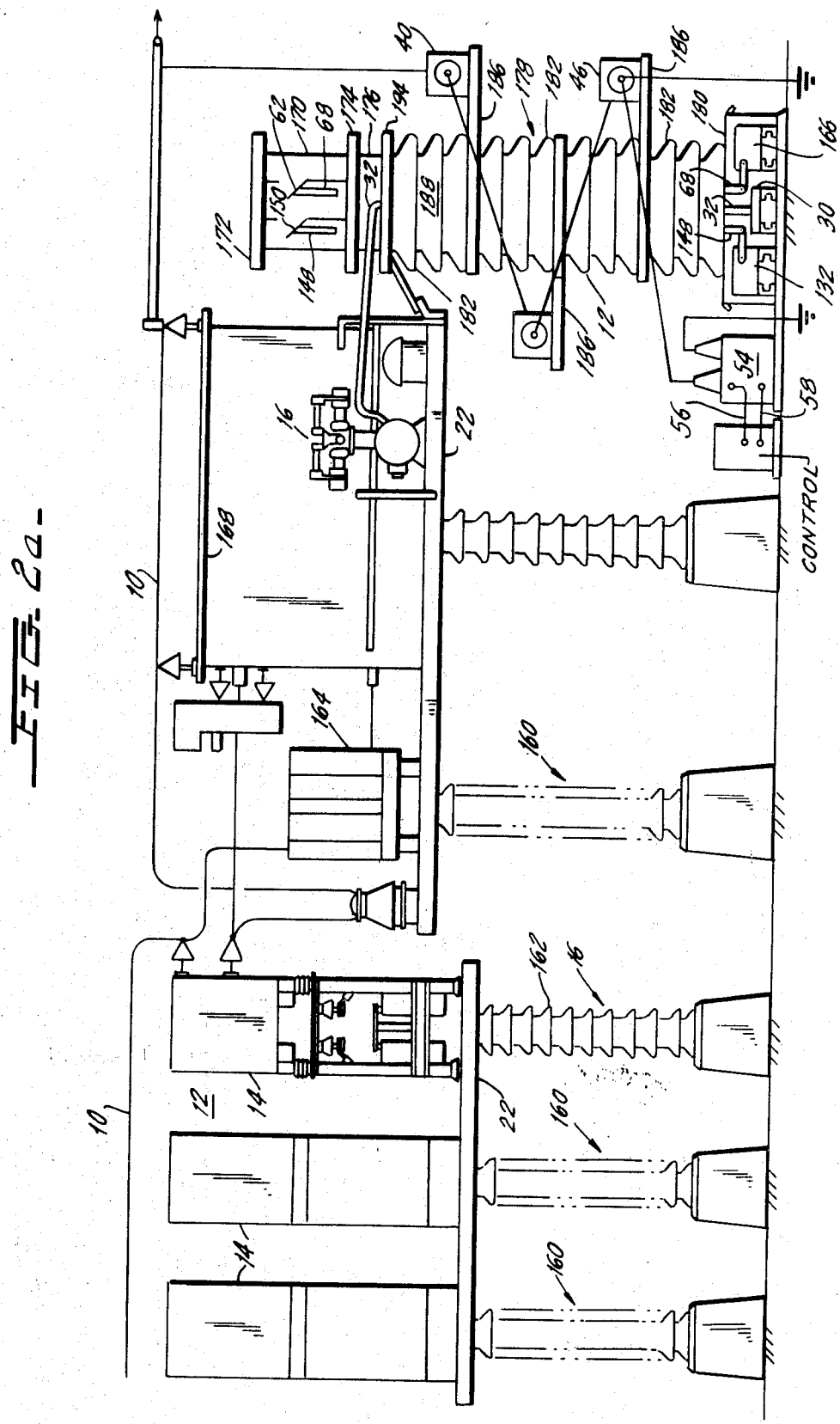

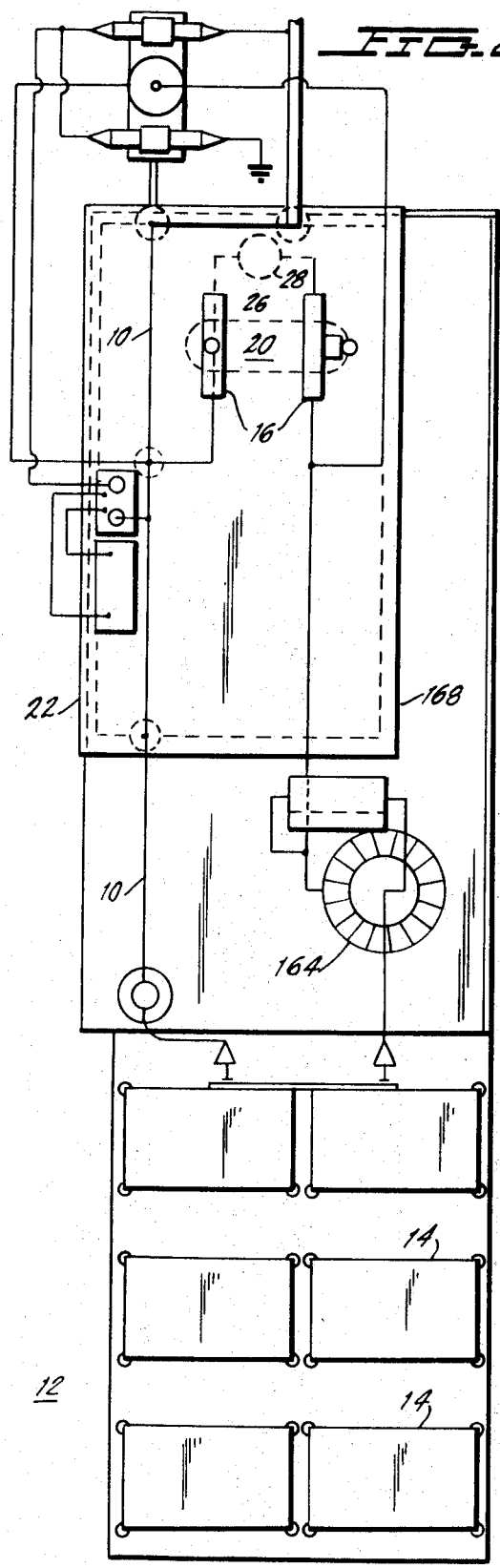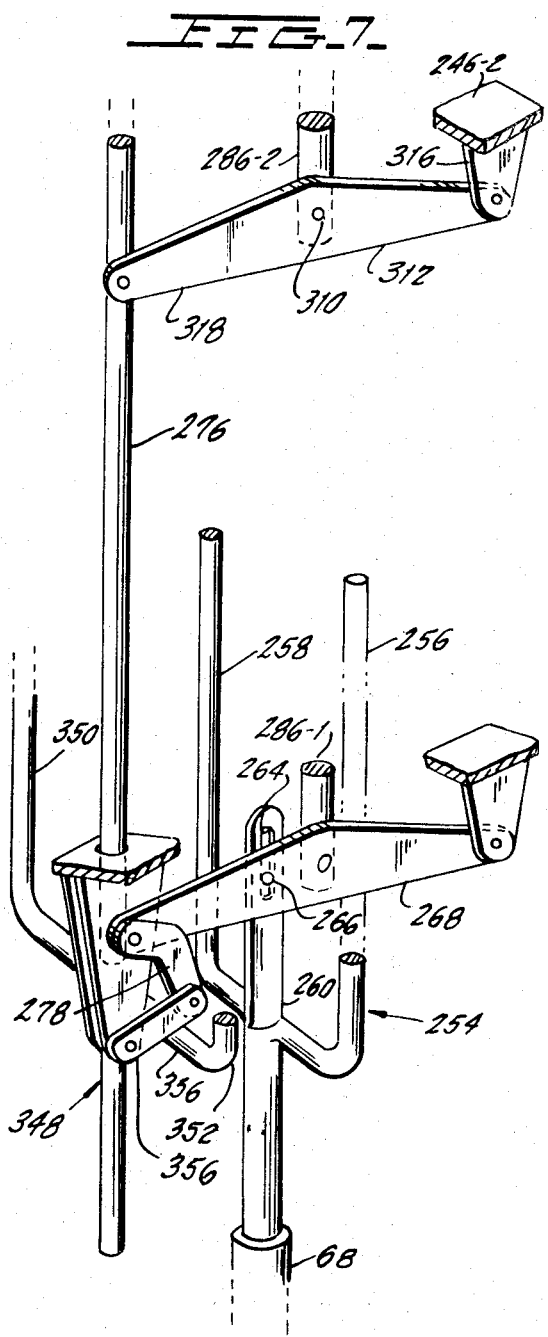

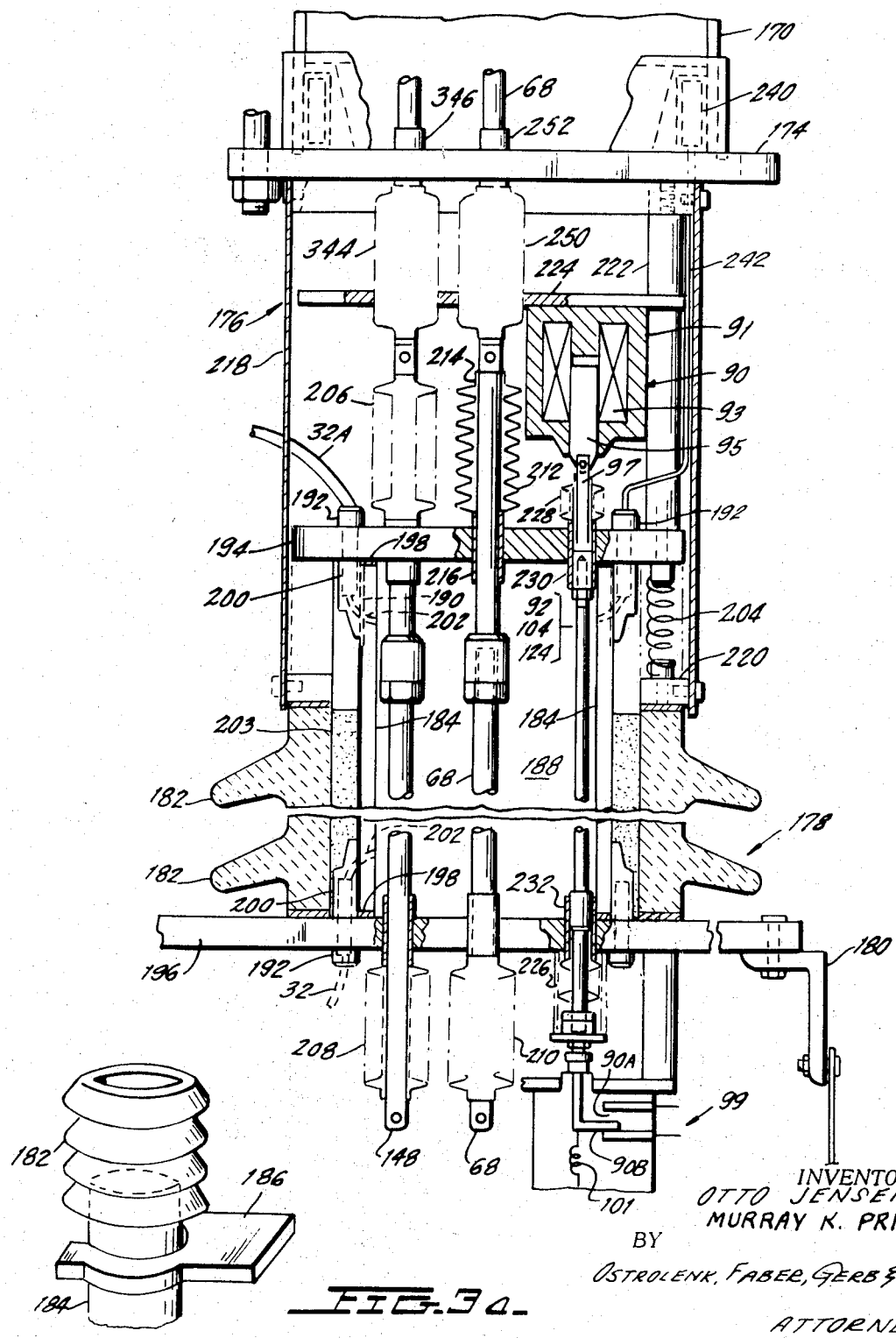

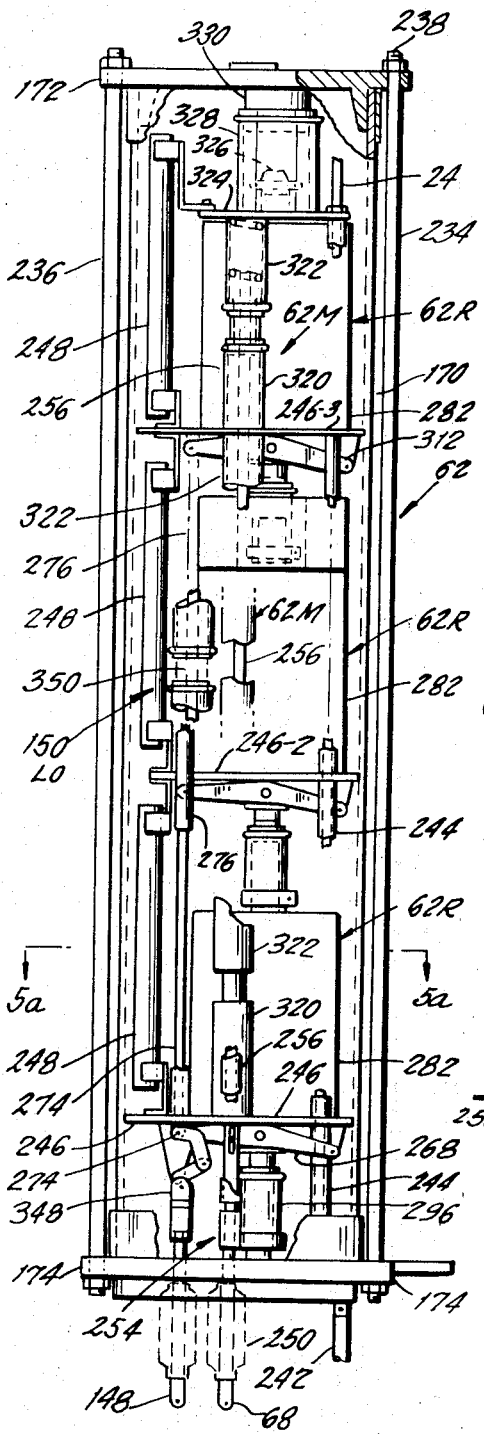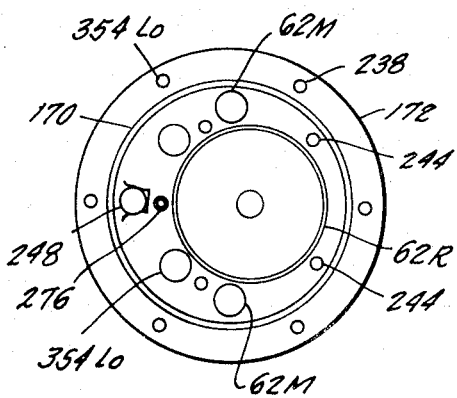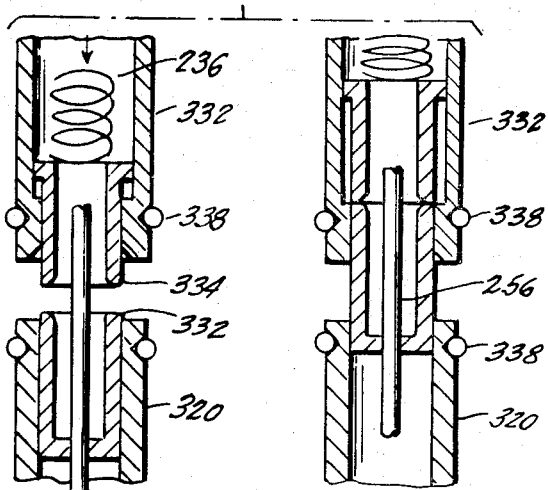

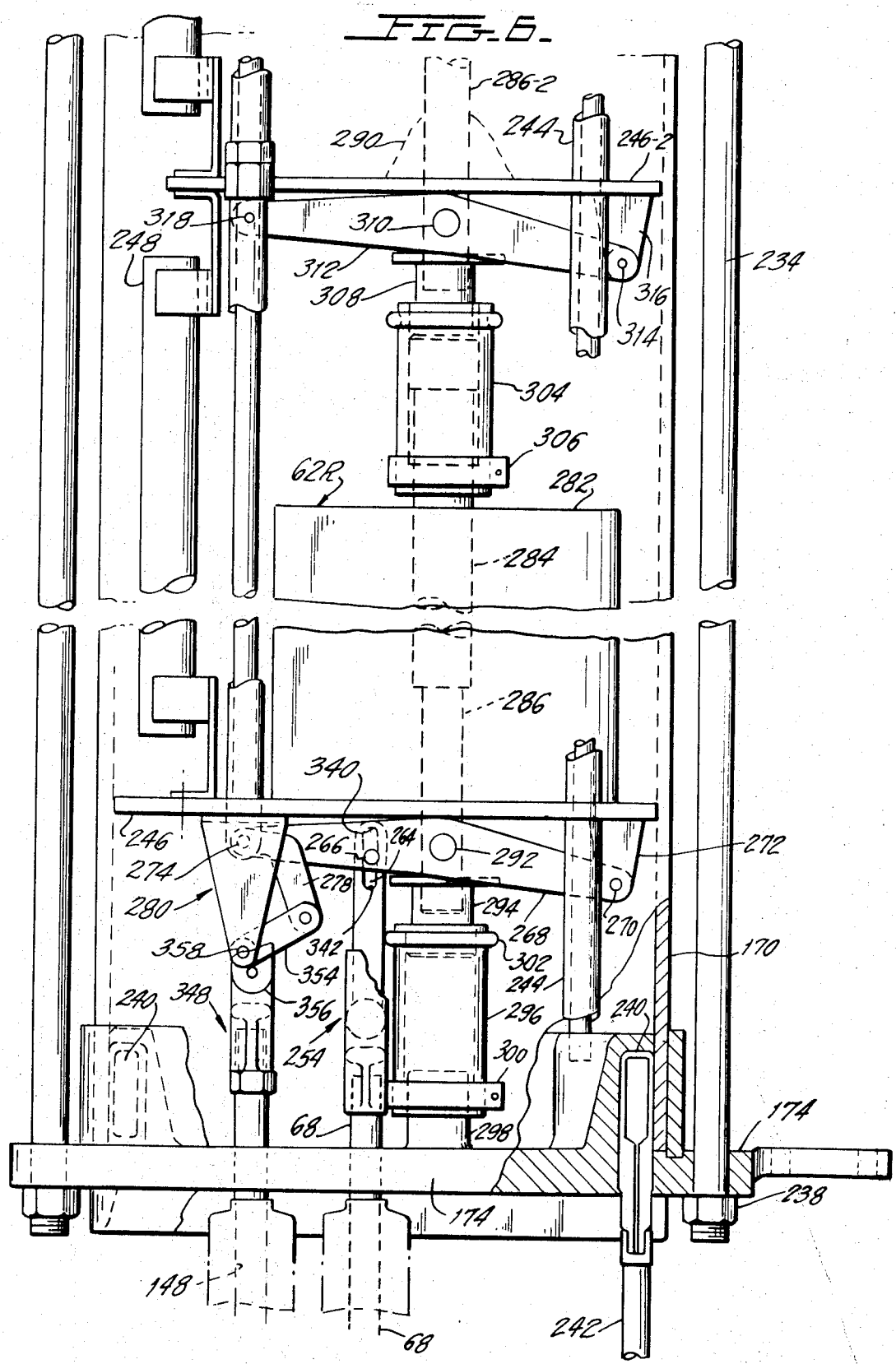

3,534,227
CAPACITOR BY-PASS PROTECTIVE SYSTEM
Murray K. Price, Downsview, Ontario, Canada, and Otto Jensen, Malvern, Pa., assignors, by mesne assignments, to I-T-E Imperial Corporation, Philadelphia, Pa., a corporation of Delaware
Filed Jan. 29, 1968, Ser. No. 701,224
Int. Cl. H02h 7/16
U.S. Cl. 317—12
17 Claims

ABSTRACT OF THE DISCLOSURE

A protective arrangement for a capacitor bank which includes a precision spark gap operating at platform potential for by-passing the capacitor bank in response to fault conditions; and quick-acting by-pass and/or lock-out switch mechanism operating at platform potential for by-passing the capacitor bank in response to other predetermined abnormalities existing for a predetermined length of time. Much of the operating mechanism for the protective arrangement is at ground potential and means are provided to insulatively interconnect various operating mechanisms at ground potential with the associated equipment at platform potential. Additionally, signalling apparatus is disclosed for insulatively transmitting information detected at platform potential to ground potential whereby the necessary protective steps and/or warning lights can be activated. A multi-purpose insulating column is disclosed which insulatively supports the by-pass and lock-out mechanism; insulatively transfers compressed gas from ground platform level; protectively houses the various power rods and signalling rods utilized in the protective arrangement. The compressed gas within the insulator column performs a dual function by more adequately insulating the by-pass and lock-out mechanism from ground potential and at the same time cooperates with bellows arrangements in such a manner as to maintain the various power rods and signalling rods in tension at all times to prevent buckling. Additionally, a voltage divider arrangement, is disclosed for providing, at one end, a relatively high potential energy source to operate the various devices which are at platform level, while at the same time providing at its other end a relatively low potential energy source to operate the various ground level operating mechanisms. The voltage divider comprises a plurality of series connected capacitors supported on the aforementioned insulating column.

This invention relates to a protective arrangement for a series capacitor bank in a high voltage alternating current transmission line, and more particularly relates to such a system which includes various protective components situated on the platform which supports the capacitor bank and are, therefore, operable at relatively high potentials substantially equal to the transmission line in which the capacitor bank is series inserted; relates to such a protective system which utilizes ground level mechanisms for operating many of the components situated on the capacitor platform; relates to means for insulatively interconnecting the various cooperating portions of the system which are at different potential levels; relates to means for insulatively transferring information detected at platform potential to ground level whereby, if desired, steps such as by-passing, lock-out or simple warning may be effectuated; relates to simple means for generating potential energy both at platform potential and ground potential for operating the various devices located on the platform and ground, respectively; and relates to various structural features which simply and economically make possible the practical utilization of the entire protective arrangement.

Series capacitor banks are used in alternating current power transmission lines to improve system operation by neutralizing the line reactance. That is, the power transmission lines themselves are known to be inductive. The existence of such line inductance disadvantageously affects the power factor, transport capacity, stability, and voltage regulation of the line. This condition is especially severe in long distance, extra high voltage lines (as for example, 500 kv. lines) which are currently coming into more frequent use.

To balance out the inductive reactance of the line, it is known to insert capacitor banks in series along the transmission line. The capacitor banks comprise a number of capacitor units arranged in parallel-series combination of sufficient capacitive reactance value to compensate for all or part of the line inductance. Since the capacitor banks constitute a constant reactance, voltage appearing across such capacitor banks will be directly proportionol to load current, therefore subjecting a non-protected series capacitor bank to an excessive voltage during occurrence of the various types of abnormal conditions which may unexpectedly develop in the line or bank in series therewith. Although the capacitor units which comprise the capacitor bank are capable of withstanding moderate overloads for brief periods of time, they will be subjected to serious damage should the line current exceed the capacitor's rated value by an excessive amount for a short period of a time (such as would instantaneously occur during a fault like a short circuit condition) or even moderately exceed its rated value for an extended period of time (such as would occur during overloads and other abnormalities existing for excessive periods of time).

The volume and price of a capacitor generally increases with the square of its maximum current rating. It is, therefore, undesirable both from the standpoint of economics and space requirements to use series capacitors rated greatly in excess of normal line current. Accordingly, it has become the practice to use a bank of capacitors rated at substantially normal loads, and to provide a protective arrangement which will quickly take the capacitor bank out of the transmission line upon the occurrence of various predetermined abnormalities against which the system is designed. A discussion of various harmful conditions which may arise during operation, and the manner in which the prior art has suggested to protect a capacitor bank from such conditions is set forth below and useful to distinguish the prior art from the contributions of the instant invention. However, it is to be understood that the various conditions listed below are merely illustrative of the multitude of faults, overloads, underloads and other abnormalities against which such protective systems can be designed.

Instantaneous fault, such as short circuits in the system, may raise the line current to many times its normal value, with a corresponding increase in the voltage sustained by the capacitor bank. This condition is extremely harmful and requires instantaneous by-passing of the capacitor bank. Protection against this type of abnormality is normally effected by spark gaps in parallel with the capacitor bank, which gaps are set to flash over in an exceedingly small amount of time as the bank voltage exceeds a predetermined value. The flash over of the spark gap establishes a low impedance parallel path around the capacitor such that the capacitor is effectively taken out of the transmission line. Many spark gaps are available in the prior art to perform such a function.

However, and regardless of its type, once a spark gap fires it will continue to conduct regardless of the magnitude of its current. Thus, means must be provided to extinguish the arc drawn in this spark gap in order to reinsert the capacitor bank in the transmission line, once the line current returns to an acceptable value. Various systems have been proposed for gap arc extinction.

One system, illustrated in Pat. 3,249,813, issued to M. Price et al. May 3, 1966, consists in providing a fast-acting switch in parallel with the capacitor bank and spark gap, and means for closing that switch automatically once the spark gap has fired. The gap current is thus transferred to the switch, and the gap arc becomes extinguished, while the bank remains bypassed by the switch. Means are also provided to monitor the line current so as to re-open the switch and thereby reinsert the capacitor bank if the abnormal current subsides within a prescribed interval, or to lock it closed if the abnormal condition persists beyond that interval.

Another system proposed for extinguishing the spark gap is illustrated in U.S. patent application Ser. No. 568,942 filed July 29, 1966, in the name of Otto Jensen, entitled "Protective Arrangement for Series Capacitor Bank," now Pat. No. 3,452,251. In accordance with the subject matter disclosed and claimed in the said Jensen application, there is provided a system wherein once the spark gap has been triggered, it remains in the conducting condition until the line current returns to its normal value, at which time the arc in the gap is extinguished on the first current "zero" by means of a blast of compressed gas stored in a tank on the capacitor platform.

Other contingencies that may arise during operation are: overloading of the total bank for harmful periods of time due to excessive line current, or localized overloading of some sections of the bank due to unbalance caused by the loss of individual capacitor units. The existence of any one of these conditions or other abnormalities requires that the capacitor bank be by-passed in order to prevent serious damage. Additionally, means must be provided to automatically reinsert the capacitor bank into the transmission line when the various abnormalities have subsided, or, alternatively, to permanently lock-out the capacitor bank if these conditions persevere for a pre-selected length of time (lock-out denoting the need for human intervention to reinsert the capacitor bank).

One such system for performing these functions is disclosed in the aforementioned Price et al. Pat. 3,249,813 wherein a plurality of appropriately located relays are energized upon the occurrence of predetermined abnormalities to close their respective contacts and in turn establish various electrical paths which actuate the associated by-pass and lock-out switches used to take the capacitor bank out of the transmission line. The above described sub-systems of prior art capacitor bank protective arrangements share similar problems which the instant invention effectively overcomes. Thus with the rapid reinsertion system of the aforementioned Price et al. patent (wherein the by-pass switch is closed once the spark gap has fired, and subsequently opened once the fault current has subsided), auxiliary power for operating the various components of the system is obtained directly from the transmission line by the use of a suitable current transformer. As a consequence, all of the components of the system, including current transformer, the by-pass and reinsertion switches, the control circuitry for such switches, etc., operate at platform potential (substantially equal to the line voltage) and as a consequence are necessarily located on the capacitor bank platform whereby they may be insulated from ground by the same insulative posts which support the capacitor bank and its platform from ground.

The same comments are equally applicable to the prior art by-pass and lock-out protective arrangements (also illustrated in the Price et al. patent) wherein the same or another by-pass switch and/or lock-out switch is operable to by-pass the capacitor in response to various overload and/or other abnormalities present in the system. That is, these protective schemes all derive their auxiliary control power from the above mentioned current transformer such that the entire protective arrangement is situated on the capacitor bank platform at substantially line potential.

Finally, a similar comment is applicable with respect to the method of spark gap extinction described in the aforementioned Jensen application Ser. No. 568,942. Thus such system depends upon the existence of compressed gas in the storage tank located at the base of the spark gap structure situated on the platform. Obviously, a compressor, with appropriate controls arranged to actuate the compressor whenever the storage tank is depleted, is a necessary component of such a system. If such compressor and control circuitry were to derive its auxiliary operating power from a line current transformer such as that shown in the aforementioned Price et al. patent, then the entire sub-system including the compressor, associated control circuitry, and all other attendant elements would be operable at platform potential and would in fact be physically located on such platform.

The requirement that various components be operable at platform potential presents many problems which the instant invention effectively overcomes. Thus it will be appreciated that when utilizing a current transformer as the source of auxiliary power, operating power for the protective system will be unavailable unless the line is carrying current even though it may be energized at one end by the application of potential thereto. Also, it will be appreciated that with arrangements such as that illustrated in the aforementioned Price et al. patent, a separate auxiliary power source must be provided on each phase of a multiphase system. Furthermore since the operating mechanism for the various protective sub-systems is located at platform potential, they will not be safely accessible for inspection and maintenance when the bank is in service. Finally since the operating mechanism for the various protective schemes are "tied" to the potential of the individual phase, the prior art schemes make it difficult to interlock the protective arrangements of all phases of a multiphase system.

In contradistinction to the prior art, the instant invention provides a protective system for a capacitor bank in which various components thereof are located at ground potential and insulatively interconnected to the various elements of the system which must necessarily operate at platform potential. In this manner the various components operating at ground potential are safely available for service and maintenance even when the transmission line is in service.

Furthermore, and in accordance with the instant invention, a novel voltage divider is provided which provides at one end, an auxiliary power source at platform potential for operating those elements and circuits which are situated at platform level. At its other end the novel voltage divider provides an auxiliary power source at ground potential for operating the aforementioned components of the system which are situated at ground level.

Furthermore, since the auxiliary power sources of the instant invention are voltage sources in nature (as opposed to current sources as in the aforementioned Price et al. patent), operation of the system continues even when there is no current in the transmission lines so long as potential is applied to it.

More specifically, and with particular reference to the sub-system for spark gap extinction, the instant invention proposes to utilize a spark gap arrangement similar to that shown and described in the aforementioned Jensen application wherein a storage tank is provided on the platform for housing compressed gas used to extinguish the arc when fault conditions have subsided. However, and in accordance with one aspect of the instant invention, the compressor used to replenish the storage tank is situated at ground level and insulatively connected to the tank via conduit means including as a portion thereof a novel hollow multi-purpose insulator column to be described in greater detail.

Furthermore, and in accordance with the invention, the above described voltage divider more specifically includes a plurality of series connected capacitors interposed between the transmission line and the ground such that the capacitor nearest the transmission line when combined with a suitable voltage transformer will provide the auxiliary power necessary to operate the storage tank valve which permits gas to be released in the process of arc extinction; while the capacitor nearest ground, when combined with a suitable voltage transformer will provide a low potential power source for operating the ground level compressor and control circuitry therefor. As will be described in greater detail, the capacitors of the voltage divider are supported by the same insulator column, the hollow interior of which functions as a portion of the conduit path linking the compressor to the storage tank.

Turning now to by-pass and automatic reinsertion subscheme, the instant invention, in carrying forth the concept of providing as much operating mechanism at ground potential as is possible, utilizes a by-pass switch, the operating mechanism for which is located at ground level. In accordance with the invention, means in the form of insulative power rods interconnect the operating mechanism of the by-pass switch, with the by-pass switch contacts at platform level such that a quick push-pull action is made possible. At the same time, the aforementioned low potential source defined at the bottom end of the voltage divider is utilized to power the operating mechanism and control mechanism therefor.

Similarly, it will be appreciated that the by-pass operating mechanism functions to by-pass and/or insert the capacitor bank upon the occurrence of predetermined conditions which are detected by various monitoring devices located on the line. Therefore, and in further accordance with instant invention, means in the form of insulative signal rods are provided to interconnect the various platform located detection devices with the control circuitry of the by-pass operating mechanism, such that information is continuously and insulatively transferred between the two points of different potential.

The instant invention also contemplates the addition, if desired, of a separate lock-out switch at line potential operated by an operating mechanism at ground potential with a similar lock-out power rod joining the two, and similar signalling means including an insulative signal rod interconnecting the platform level lock-out detection devices and control circuitry with associated circuitry at ground level. As with the system for spark gap extinction and the by-pass subsystem, the control circuitry of the lock-out system which is a platform potential derives its power from the top of the novel voltage device, with its control circuitry at ground level derives its power from the bottom thereof.

Finally, the instant invention contemplates that the various power rods and signal rods be protectively housed with the very same hollow insulator which (1) supports the by-pass and lock-out switch, (2) supports the voltage divider and (3) functions to supply gas from the compressor at ground level to the storage tank on the platform.

Accordingly it is an object of the instant invention to provide a protective arrangement for a capacitor bank which includes many components at platform potential and many operating components therefor at ground potential whereby the ground level components will always be accessible for maintenance and inspection even when the transmission line is in service.

Another object of the instant invention is to provide such a system which includes novel voltage divider means providing high potential energy at one end therefor for operating the various components of the system which are at ground level.

Another object of the instant invention is to provide a protective arrangement for a capacitor bank which includes a spark gap extinguishing system including a gas tank at platform level, a compressor at ground level and means intermediate the tank and compressor for insulatingly conveying compressed gas therebetween.

Another object of the instant invention is to provide such a protective arrangement wherein a hollow insulator column is used to convey the aforementioned gas between the compressor and storage tank while at the same time the gas in transit functions to provide excellent insulation between ground and by-pass switch supported thereon.

Still another object of the instant invention is to provide such a capacitor protective arrangement wherein the insulator column simultaneously supports a voltage divider defined by a plurality of series connected capacitors interconnected between a transmission line and ground.

Yet another object of the instant invention is to provide such an arrangement wherein the capacitor nearest the transmission line provides a high potential energy source operating the various platform located components of the system and wherein the capacitor nearest ground provides a low potential energy source for operating the various components of the system which are situated at ground level.

Another object of the instant invention is to provide such a supporting arangement for the capacitors of a voltage divider wherein the insulator column is comprised of a plurality of stacked modules interposed with extending flanges upon which the various capacitors of the voltage divider are supported.

Yet another object of the instant invention is to provide such a system which includes quick acting by-pass and/or lock-out switches, including contacts at platform potential and the operating mechanism therefor at ground level potential, such that the operating mechanism may be inspected at all times regardless of whether or not the transmission line is in service.

Another object of the instant invention is to provide such a system wherein power means are insulatingly provided to interconnect a by-pass and/or lock-out switch and the operating mechanism thereof to provide quick make and break action.

Yet another object of the instant invention is to provide such a system wherein a voltage divider includes a high potential portion to operate various components located at platform level and a low potential portion which operates the various control circuits and components associated with the ground level operating mechanism of the aforementioned by-pass and/or lock-out switches.

Still another object of the instant invention is to provide signalling means insulatively interconnecting detection apparatus provided at platform level and control circuitry provided at ground level.

Still another object of the instant invention is to provide a protective system for a capacitor bank inserted in a high voltage alternating current transmission line, in which a hollow insulating column performs a multitude of functions which include supporting a by-pass and/or lock-out switch; conveying gas from a compressor to a tank; protectively housing various power rods and signalling rods; and supporting a plurality of capacitors which define a voltage divider network useful in the overall operation of the capacitor by-pass system.

Other objects of the instant invention may be had by referring to the following description and drawings in which:

FIG. 2A shows a front elevation view of a capacitor installation and protective arrangement therefor constructed in accordance with the schematic diagram of FIG. 1;

FIG. 2B is a plan view of the system of FIG. 2A;

FIG. 3 is a view partly in section illustrating various features of the instant invention including the cooperation between a multi-purpose insulating column, a signal and transition compartment, and by-pass and/or lock-out switch;

FIG. 3A illustrates a portion of the insulating column of FIG. 3;

FIG. 4 is a view partly in section showing the by-pass and lock-out switch used in the system of the instant invention;

FIG. 5A is a view taken along the arrows 5A—5A of FIG. 4;

FIGS. 5B, 5C and 5D show various components of the by-pass switch illustrated in FIG. 4;

FIG. 6 is an enlarged view of a portion of the bypass and lock-out mechanism, illustrated in FIG. 4;

FIG. 7 is a somewhat schematic perspective view of the by-pass lock-out mechanism of FIG. 4, illustrating the relationship of some of the elements shown therein.

Figure 1:
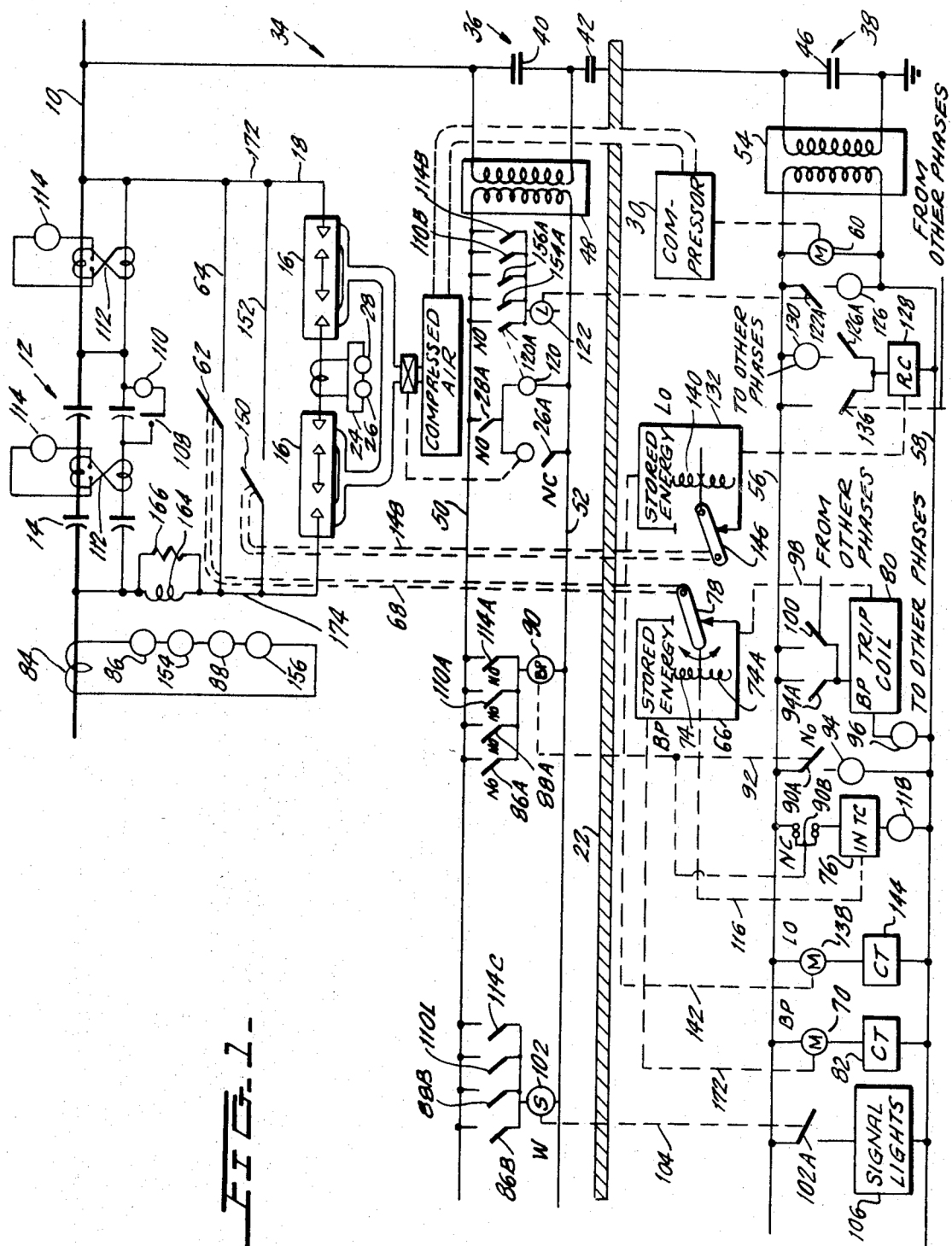
FIG. 1 is a schematic diagram illustrating a complete by-passing protective arrangement embodying the teachings of the instant invention.

Turning to FIG. 1, there is illustrated one phase 10 of a multi-phase alternating current transmission system. As noted previously, and especially in high voltage lines, carrying in the order of hundreds of kilovolts, it is customary to insert capacitor banks in series with the line to compensate for the natural inductance, thereof. Such a capacitor bank is illustrated at 12 and includes a plurality of individual capacitor units 14 arranged in a series parallel relationship to establish sufficient capacitance to neutralize all or a desired part of the inductance of the transmission line.

It will be appreciated, that although a single phase 10 and a single capacitor bank 12 have been shown in FIG. 1, in a multi-phase system, there would be a similar capacitor bank provided in each phase. Similarly, it is to be understood that although the following discussion will describe a protective arrangement for the capacitor bank 12 of FIG. 1, a similar protective arrangement would be provided for each capacitor bank, utilized in a multi-phase phase system.

Broadly speaking, the purpose of the protective system of the instant invention is to protect the capacitor bank 12 from the various abnormalities which may occur within the bank 12, or along the transmission line 10. Being more specific, it may be appreciated that the occurrence of severe faults within the transmission line 10 (such as those which occur during short-circuits) required that the capacitor bank 12 be instantaneously removed from the transmission line. The apparatus usually utilized in the prior art to effectuate such operation includes a spark gap in parallel with the capacitor bank, which spark gap is designed to instantaneously arc over, once a predetermined voltage, proportional to the line current, is applied across the bank. When the gap fires a low impedance path is established in parallel with the capacitor bank, thereby effectively removing the capacitor bank from the transmission line.

The protective arrangement of the instant invention incorporates such spark gap operation to by-pass the capacitor bank 12 in the event of instantaneous faults within the transmission line 10. Thus a pair of double ended spark gaps 16 are inserted in a parallel path 18 with the capacitor bank 12 and are so designed as to arc over and thereby by-pass the capacitor bank 12, upon the occurrence of a predetermined potential.

Although the instant invention is in no way limited hereto, a particularly advantages spark gap construction useful in the system of the instant invention is disclosed and claimed in U.S. patent application No. 568,942, filed July 29, 1966, in the name of Otto Jensen and entitled Protective Arrangement for Series Capacitor Bank.

As noted earlier, regardless of the construction of the spark gap chosen, all spark gaps continue to conduct current (even when the fault has subsided) until extinguished. One method of extinguishing the arc is to direct a blast of compressed gas into the spark gap as illustrated in the aforementioned Jensen application 568,942. As is explained in greater detail in said application, compressed air is stored on the platform which supports the capacitor bank and spark gaps, and is released to extinguish the gap upon the activation of various control circuits, which are in turn responsive to detection devices which monitor the flow of current through the line. Although the utilization of such a system is not a prerequisite, its utilization and description with respect to FIG. 1 illustrates a broad aspect of the instant invention.

Thus, in FIG. 1 a supply of compressed gas 20 is situated on the platform 22 beneath spark gaps 16 (see FIG. 2A). Assuming that a fault of predetermined magnitude has occurred, the spark gap 16 will arc over and conduct current, thereby taking the capacitor bank 12 out of the line. Upon the return of the line current to an acceptable value as detected by a monitoring circuit 24; various relays 26 and 28 will cooperate with their respective contacts 26A and 28A to either release the compressed gas in the tank 20 to extinguish the arc and thereby reinsert the bank 12 or alternatively, actuate lock-out mechanism (to be further described) for permanently by-passing the capacitor bank 12, in the event that the fault has not subsided within a predetermined time interval.

For a detailed discussion of operation of the various control circuits utilized to effectuate arc extinction in the above described mode, reference is made to the aforementioned Jensen application, which description is incorporated herein by reference thereto. For purposes of understanding one basic contribution of the instant invention it is sufficient to point out that such gap extinction system presents two immediate problems. First, it is obvious that there must be a compressor of some type to replenish the storage tank 20 after an extinction operation. The location of this compressor presents the problem. Secondly, there must be control power available to power the compression and various control circuits utilized in the system.

With respect to the first problem, the compressor might be located on the platform 22 relatively close to the storage tank 20. However, it will be appreciated that if the compressor were located on the platform, it would be situated at platform potential (nearly equal to line potential) and be unavailable for servicing and maintenance while the line was in service.

A first aspect of the protective system of the instant invention proposes that as many components as possible be situated at ground level, and operable at ground potential with various means being provided to insulatively interconnect the various cooperating components situated at platform and ground respectively. When this concept is applied to the gap extinction system illustrated in FIG. 1, the compressor 30 is situated at ground level and means in the form of conduit path 32 insulatively interconnects the ground level component of the system, the compressor 30, with the platform level element of the system, the storage tank 20.

The second problem referred to previously was described as the need for an auxiliary power supply to operate the various components of the gap extinction system. The prior art has suggested current transformers tapped off the transmission line 10, but as noted earlier, this solution has presented problems, such as the need for current flow through the line 10 in order to keep the various components operable.

A second aspect of the instant invention solves the prior art difficulty by proposing the use of voltage sources derived from the transmission line (such that the auxiliary components will operate even though no current is flowing through the line, so long as potential is applied to it) while at the same, this second aspect of the invention complements the first aspect by providing a voltage divider network generally illustrated at 34 in FIG. 1 which at one end, 36, will provide a potential source at substantially platform potential, while at the other end, 38, will provide a potential source which is relatively close to ground potential. The potential source at platform potential operates those components of the system which are situated on the platform while the potential source at ground level operates those components of the system situated at ground level.

Specifically, the voltage divider 34 comprises a plurality of capacitors, such as 40, 42 and 46, interposed in electrical series between the transition line 10 and ground with the uppermost capacitor 40, when combined with a suitable stepdown transformer, 48, providing operating potential between the lines 50 and 52 for operating the various control circuits at platform potential; while the lowermost capacitor 46, when combined with a suitable step-down transformer 54, will provide a relatively low potential power source between lines 56 and 58 for operating the various components of the system which are at ground level such as the motor 60, utilized to operate the compressor 30.

Turning now to the aspect of the protective system of the instant invention dealing with protection against abnormalities, such as overloads, which persist for a predetermined length of time; the occurrence of these conditions necessitates a by-passing sequence in order to protect the capacitor bank and means to reinsert the capacitor bank once the abnormality has subsided. In providing this type of sub-system, the instant invention again utilizes the principle that as many components as possible of the system should be located at ground level, and means provided to insulatively interconnect the various components at ground level with the associated parts at platform potential. Thus bypass switch means 62 to be described in greater detail, is situated in a second parallel path 64 and operable to bypass and insert the capacitor bank 12 by means of operating mechanism 66, situated at ground level. In accordance with the invention, means in the form of insulative power rod 68 interconnects the switch contacts 62 with the operating mechanism 66.

The operating mechanism 66 is preferably of the stored energy type employing large springs which are compressed by a stepping ratchet and driving pawl arrangement (schematically illustrated at 72) operated by a motor 70 in the manner shown and claimed in U.S. Pat. No. 2,961,067 issued to R. V. Starr, entitled "Electrically Operated Stored Energy System for Circuit Breakers." Although the specific manner of charging the spring 74 is not the subject of the instant invention, it is important to point out that in accordance with the instant invention, the motor 70 of such a spring charging system would derive its operating potential from the lines 56 and 58 connected through the transformer 54 to the capacitor 46 of the voltage divider network 34.

In operation, the motor 70, through the linkage 72, compresses the spring 74. Control circuitry generally indicated at 82 and described in greater detail in the Yarrick et al. 2,961,068 patent functions to interrupt the circuit through to motor 70, once the spring 74 is completely charged.

Assuming that the bypass switch 62 is closed so that the capacitor bank 12 is electrically out of the line 10; upon the energization of an insert trip coil 76, which, as will be further described, occurs when the abnormality which initially carried the compressed spring 74, is released to rotate arm 78, which in turn, through the bypass power rod 68 opens the switch 62, thereby reinserting the capacitor bank 12 into the line 10.

While the spring 74 was expanding, a second spring 74A is compressed and stores sufficient energy to rotate the arm 78 in the opposite direction to close the switch 62 when a bypass trip coil 80 is energized, in a manner to be further described, by the occurrence of a new abnormality. Meanwhile, once the main spring 74 has been discharged to interrupt parallel path 64 and insert the capacitor bank, the motor 70 is actuated once again to recharge the springs 74. Further details on the charging mechanism and control circuitry, therefore, may be had by referring to the aforementioned Yarrick and Starr patents, the contents of which are incorporated herein by specific reference thereto. In the bypass operation described above, it will be apparent that there will be provided detection elements to monitor the line conditions and generate bypass and insert command signals in response to the occurrence and subsistence of the various faults. Since these monitoring devices must operate at line potential, means must be provided to transfer these signals to ground whereby the operating mechanism 66 can be actuated to open and close the switch 62. Another aspect of the invention provides such a signalling system.

Specifically, a monitoring circuit 84 is inductively coupled to the line 10. Overload and/or underload bypass relays 86 and 88, respectively, are activated upon the occurrence of predetermined overloads of underloads occurring in the line 10.

Associated with the overload bypass relay 86 are normally open contacts 86A, which close whenever the overload bypass relay 88 has normally open contacts, 88A associated therewith, which also will close upon the activation of underload bypass relay 88 responsive to a predetermined underload in a line 10. The closing of contact 86A will establish a circuit path from line 50 to 52 through by pass signal coil 90.

Bypass coil 90 has associated therewith, at ground level, normally open contacts 90A and normally closed contacts 90C. As will be explained in greater detail, both contacts 90A and 90B are operable to their opposite state by the movement of an insulative bypass signal rod 92 in response to energization of bypass relay 90. It will be appreciated that this signalling system transfers information between levels of different potential.

Closing of the normally opened contact 90A completes a circuit path between power lines 56 and 58 through relay 94, the normally open contacts 94A of which are closed to complete a circuit path through the bypass trip coil 80 and relay 96.

As indicated previously, the energization of the bypass trip coil 80 releases the spring 74 of bypass operating mechanism 66 (the link between the coil 80 and the operating mechanism 66 being schematically illustrated by the phantom line 98) to rotate the arm 78 which in turn, through the bypass power rod 68, causes the closing of switch means 62. The very fast operation of the bypass mechanism from the moment of discharge of the spring 74 through the movement of power rod 68, permits a very rapid insertion of the switch 62 in paths 64 (in a manner to be more fully explained) thereby quickly bypassing the capacitor bank 12 to protect it from the fault which initially triggered the activation of the overload or underload bypass 86 or 88 respectively.

It should also be pointed out that the energization of the relay 96 causes its associated normally opened contacts located in other phases of the system (not shown) to close thereby effectuating the energization of the respective bypass trip coils in those phases to initiate a similar bypass operation, thereby preventing a condition known as single phasing. Similarly, normally opened contacts 100 in parallel with contacts 94A will close to energize bypass trip coil 80 to initiate bypass operation in line 10 in response to the occurrence of faults detected in other phases of the system.

It is to be understood that the above described communication arrangement provided by the instant invention for signaling between platform and ground level may be utilized simply to provide the energization of warning signals on the ground instead of and/or in addition to the generation of bypass command signals as previously explained. Thus overload bypass relay and underload bypass relay 86 and 88 respectively could be provided with a second pair of normally opened contacts 86B and 88B, which when closed provide a circuit between the power lines 50 and 52 through a warning signal relay 102, which when energized moves the insulation signal rod 104 to close the normally opened contacts 102A at ground level which thereby completes a circuit between power lines 56 and 58 through the warning light schematically illustrated at 106.

In addition to providing a bypass operation in response to overloads and underloads, the instant invention can be utilized to initiate a bypass operation in response to many other harmful conditions which may occur on the bank. Two such conditions are illustrated in FIG. 1, it being understood that the basic principles of the instant invention may be utilized to monitor any condition desired and to initiate bypassing action in response thereto. Thus a thermostatic type of temperature responsive monitoring element 108 can be provided to sense abnormal heat conditions within an individual capacitor unit 14 and a relay 110 energized when the sensing element completes a circuit therethrough. Relay 110 has normally open contacts 110A associated therewith which close upon the energization of the relay to establish a circuit path through the bypass relay 90. As described above, by means of the bypass signal rod 92, the control circuitry at ground level will be activated to energize the bypass trip coil 80 which releases the energy in the operating mechanism 66 to close the bypass switch means 62.

Similarly, current sensing elements 112 may be inserted in the individual sections of the capacitor bank 12 to detect current imbalance in the various capacitor strings such as might be caused by the loss of more than one capacitor unit per string. In such case, relays 114 associated therewith would be energized to close the normally open contacts 114A which in turn energize the bypass relay 90 to initiate the bypass operation in the manner previously described.

In the event the fault which has caused the bypass operation subsides, then the relay associated with that fault (relay 86, 88, 110 or 114) is deactivated and by means of internal springs (not shown) the various contacts associated therewith (86A, 88A, 110A, 114A) will revert to their normally opened condition thereby interrupting the current load through the bypass relay 90. By means of springs not shown in FIG. 1, the bypass signal rod 92 will revert to its initial condition thereby returning contacts 90A and 90B to their normally opened and normally closed positions respectively. When contact 90B is closed, the insert trip coil 76 is energized which in turn, through the link schematically designated 116, releases the spring 74 of the bypass operating mechanism 66 which in turn through the power rod 68, opens the switch means 62 and reinserts the capacitor bank 12 back into the line.

Summarizing the various bypass and insert operations described thus far, it will be appreciated that the system thus described has combined two somewhat related subsystems. Thus one signalling subsystem of the instant invention permits monitoring devices to be installed at line potential and the occurrence of predetermined conditions to be insulatively communicated to ground level. The second subsystem is, in effect, responsive to these signals and initiates the operating of mechanism of ground level, the energy from which is then transferred back to the associated switch on the platform level. In this manner, both the operating mechanism for the bypass switch, and in addition the various control circuitry associated therewith is at ground potential and always available for servicing and maintenance.

Also to be appreciated is the fact that both of these two related subsystems take advantage of the previously meintioned aspect of the invention dealing with the voltage divider 34. Thus all platform level circuitry derives its power from capacitor 40 while all ground level components derive auxiliary electrical power from capacitor 46.

As noted previously, when a fault has perserved for a predetermined length of time, it is usually the indication that there is something critically wrong with the system. Thus in prior art protective systems and in the protective system of the instant invention means are provided to "lockout" the capacitor bank in the event that a particular fault fails to return to acceptable values within a predetermined period of time. Thus the sequence is normally the occurrence of a harmful condition; taking the capacitor bank out of the line automatically (by it by a bypass operation or a spark gap operation); and finally if the harmful conditions prevail, the establishment of a permanent bypass about the capacitor bank which cannot be interrupted without the intervention of a human operator.

To this end, that subsystem of the instant system which is directed to spark gap operation employs a system similar to that described and claimed in the aforementioned Jensen application 568,942. Thus, as explained in greater detail in the aforementioned Jensen application, 568,942, when the normally opened contact 28A is closed, a time delayed relay 120 beings to operate.

Time delay relay 120 has normally open contacts 120a associated therewith which will be closed by time delay relay 120 if it is not deenergized within a predetermined time interval.

Thus, if relay 26 does not sense, within the predetermined period, that the line current is returned to acceptable value, and initiate the release of compressed gas to extinguish the arc in gaps 16, contacts 120a will close to establish a current path between lines 50 and 52 through the lock-out relay 122, part of the signaling system for communicating the lock-out signal from platform potential to ground. As will be further described, and as was the case with the bypass signaling system and warning light signaling system previously described, energization of the lock-out relay 122 actuates lock-out signal rod 124 to close normally opened contacts 122a, thereby establishing a circuit path between lines 56 and 58 and a relay 126. Energization of relay 126 closes normally opened contacts 126a, thereby completing a circuit path through the lock-out trip coil 128 and a relay 130.

Energization of lock-out trip coil 128 initiates discharge of lock-out operating mechanism 132 through the link schematically illustrated at 134, while energization of relay 130 causes the closing of associated contacts in other phases of a multi-phase system to provide an insert command signal in the other phases. Similarly, normally opened contacts 136 are provided in parallel with contacts 126a and are closed upon energization of an associated relay in other phases of the system thereby initiating the lock-out operation in the phase illustrated in FIG. 1 in response to the occurrence of lock-out signals generated in other phases.

It will be appreciated that since all ground level circuitry in a multiphase system will operate at the same potential level, it is easy to interconnect the various phases.

Lock-out mechanism 132 is similar to bypass operating mechanism 66. It is of the type illustrated in the aforementioned Starr and Yarrick patents. Thus a lock-out motor 138 charges an internal spring 140 (through the link schematically illustrated at 142) and has control circuitry schematically illustrated at 144 for disconnecting the motor 138 once the spring 140 is fully charged.

Thus reception of the signal from the lock-out trip coil 128 permits discharge of the spring 140 to rotate arm 146 which in turn moves the lock-out power rod 148 to close the lock-out switch means 150 located in another parallel path 152 on the capacitor platform.

To provide lock-out operation in response to other types of faults which exist for predetermined lengths of time, time delayed overload and underload lock-out relays 154 and 156 are provided in the monitoring circuit 84. If the various faults detected by these relays have not subsided within the operating time chosen for the time delayed relays, the respective contacts 154a and 156a will close to energize lock-out relay 122 which in turn, through the lock-out signal rod 234, will close the contacts 122a at the ground level control circuitry to initiate the lock-out operation.

Similarly, time delay relays (not shown) in the sensing circuits 108 and 112 could include contacts such as 110b and 114b to initiate the lock-out operation in the event that these particular abnormal conditions have not returned to acceptable values within predetermined time limits. Similarly, the lock-out time delay relays (not shown) may cooperate with associated contacts such as 110c and 114c to energize the warning signal relay 102 to energize warning lights 106 at ground level to indicate a lock-out operation is imminent.

It may be noted that the essential difference between the lock-out function and the bypass function is that when the capacitor bank 12 has been bypassed by the switch 62 in response to the occurrence of abnormal conditions in the line and/or bank, such switch 62 will be opened automatically to reinsert the bank if the particular abnormality subsides within a predetermined time limit. If that fault has not subsided, the bypass switch 62 will remain closed and, in addition, lock-out operation will take place to permanently close lockout switch contact 150 (permanently signifying that contact 150 cannot be opened without the intervention of a human operator). Furthermore, as will be shown in greater detail, interlocking means are provided whereby in the event that both the bypass and lock-out operation has occurred, and after the system is entirely cleared, before the bypass contact 62 can be opened in an attempt to reinsert the capacitor bank 12, the lock-out switch contact 150 must be opened first.

Thus a basic protective system for a capacitor bank has been disclosed, it being understood that the various sub-systems described cooperate with one another to define an over-all protective system. However, it is to be understood that the various sub-systems may also be practiced without the utilization of each and every other subsystem. For example, the by-pass operating mechanism could be utilized without a lock-out mechanism or vice versa or either one or both could be used with or without the particular spark gap system that has been described. However, regardless of which combination of elements or whether the entire system is utilized, basic contributions of the instant invention should be apparent. Thus a first aspect of the instant invention makes possible the utilization of many components of the various sub-systems at ground level. These elements at ground level are always available for maintenance and inspection even when the platform is energized at high potential. Secondly, there has been provided insulative means to interconnect the various components at ground level with the cooperating operating mechanisms at platform potential. For example, the air duct 32 used in the compressed air system, and the lock-out and by-pass power rods 68 and 148 have been provided to insulatingly transfer power developed at ground level up to platform. Additionally, signaling systems in accordance with the instant invention make possible transmission of information gathered at platform potential to the various control circuitries and mechanisms at ground level. Simultaneously, the instant invention has made possible the elimination of auxiliary platform energy sources and instead utilizes a basic capacitor voltage divider which makes potential energy available at the two different potential levels at which the various components of the protective system are operating.

In addition to making the ground level equipment available for safe inspection and maintenance at all times, the invention facilitates intercommunication between phases.

Furthermore, it is to be appreciated that the concept of providing potential energy both at high platform potential level and at low ground level potential can be practiced in combination with a variety of systems including one or more of the individual sub-systems which form other aspects of the instant invention.

Turning now to FIGS. 2A through 7, there is shown the manner in which the protective system, schematically illustrated in FIG. 1, may be implemented to provide a complete protective station for a capacitor bank in a high voltage transmission line. Thus, in FIGS. 2A and 2B there is shown the platform 22 insulatively maintained above ground by the insulator columns 160, preferably comprising a plurality of stacks individual insulator cones 162, the number of which would depend upon the voltage of the line being carried.

Supported upon the left-hand portion of the platform 22, as viewed in FIG. 2A, is the capacitor bank 12 in series with the transmission line 10. As noted with respect to FIG. 1, the capacitor bank 12 comprises a plurality of individual capacitor units 14 arranged in series parallel relationship to provide the desired reactance.

Supported upon an adjacent portion of the platform 22 is that portion of the protective system of FIG. 1 which operates at platform potential. Specifically, a reactance 164 in parallel with a resistance 166 (see FIG. 2B) is provided at platform potential (see also FIG. 1) to function as a current limiter during the occurrence of faults within the line 10.

Situated within a protective housing 168 is the spark gaps 16 situated upon the storage tank 20, with the monitoring transformer and relays 26 and 28 associated therewith being in series between the spark gaps 16.

Also within the enclosure is the transformer 48 in parallel with the top capacitor 40 of the voltage divider network 34 of FIG. 1, and the control circuitry at platform potential which is established between the power lines 50 and 52.

As will be explained in greater detail, the by-pass and lock-out switch means 62 and 150 are housed in a cylindrical tube 170 at platform potential with the terminals 172 and 174 thereof established in parallel about the spark gaps 16 and capacitor bank 12. The by-pass lockout tube 170 is supported upon transition tube 176, to be described in greater detail, which, in turn, is supported upon a multipurpose insulator column 178, which, in turn, is supported upon an enclosure 180 which houses the by-pass operating mechanism and lock-out operating mechanism 66 and 132, respectively, as well as compressor 30, all at ground level. Also, at ground level is transformer 54 which is in parallel with the lowermost capacitor 46 of the voltage divider 34, as well as the ground level control circuitry and various associated components which are operable by the potential level developed between the power line 56 and 58.

Multipurpose Insulating Column 178 is described in greater detail and claimed in U.S. Pat. application Ser. No. 699,624, filed Jan. 22, 1968, in the name of Otto Jensen and entitled "Multipurpose Insulating Column," and assigned to the assignee of the instant invention.

Column 178 is preferably comprised of a plurality of hollow modular insulator segments 182 stacked upon one another. Separting each of the modular components 182 is a supporting platform 186 which supports the various capacitors 40, 42 and 46 of the voltage divider 34 schematically shown in FIG. 1. Thus, it will be seen that a first function of the insulator column 178 is to insulatingly support platform level bypass and/or lock-out tube 170 with respect to the ground. The second function of the tube 178 is to support the capacitor units defining the voltage divider network by which platform potential and ground potential energy sources are made available at either end thereof.

FIG. 2A illustrates two further functions of the insulator column 178 in the protective system of the instant invention. Thus, as schematically illustrated in FIG. 2A, the by-pass operating mechanisms 66 and the lock-out power mechanisms 152 are situated beneath the insulator column 178 such that the by-pass and lock-out power rods 58 and 148, respectively, extend vertically up through hollow insulator column 178 and into cooperative relationship with the by-pass and lock-out switch means 62 and 150, respectively, schematically illustrated within the tube 170 of FIG. 2A. Thus, the third function of the multipurpose insulator 178 is to protectively house such power transferring rods which link the ground level mechanism and the associated platform level switches. Also, it will be shown that the insulating column protectively house signal rods, such as 92, 104 and 124.

Also, schematically illustrated in FIG. 2A is the manner in which the column 178 performs another function associated with the protective system of the instant invention. Specifically, the compressor 30 is situated beneath the column 178, such that the conduit path 32 includes as a portion thereof the hollow interior 188 of the column 178. Specifically, conduit 32 enters one sealed end of the hollow column 178 and is in communication with the relatively large interior hollow passageway 188. At the opposite end column the tube 32 sealing by-passes through the sealed end of the column 178 and continues its way to the storage tank 20 on the platform 22. Thus, the enlarged hollow interior 188 of the insulating column 178 may be thought of as an integral portion of the conduit 32, and continuously aids in supplying gas from the compressor 30 to the gap extinction storage tank 20. Thus, in effect another function of the column 178 is to function as a pipe.

Finally, the insulator column 178 and the gas contained therein perform another function. Specifically, the compressor 30 maintains the gas within hollow interior 188 of the insulating column 178 under constant pressure. This compressed gas under pressure within the insulating column 178 itself performs a dual function in that it more adequately insulates the by-pass and/or or lock-out mechanism tube 170 from ground level; while simultaneously, and in a manner to be further described, the pressure therein is utilized to maintain all the power rods and signaling rods passing therethrough in a state of constant tension to neutralize any buckling effect they may experience in operation.

Turning to FIG. 3, it will be seen that the insulating column 178 includes an inner tube 184, preferably made of wound glass filament bonded with epoxy resins. It is the inner tube 184 which is filled with compressed air, thereby increasing the internal dielectric strength of the hollow interior 188.

The ends of the tube 184 are circumferentially threaded at 190 to receive termination fittings 192 which perform a dual function. First, the termination fittings 192 secure the inner tube 184 to end flanges 194 and 196, with suitable gaskets 198 being provided between the ends of the tube 184 and the flanges 192 and 196, respectively, to provide an airtight seal therebetween. Secondly, the termination flanges 192 are made hollow as indicated at 200, so as to communicate with apertures 202 provided on the tube 184.

Thus, conduit 32, communicating with the compressor, at one end, and the lower termination fitting at the other end. Conduit 32a communicates with the storage tank 20 on the platform at one end, and the upper fitting termination 192 at the other end. Thus, the complete conduit path is established between the compressor at ground level and the tank at platform level, which conduit path includes the hollow interior 188 of the tube 184 as a portion thereof.

The inner tube 184 is protected by concentric glazed porcelain tube segments 182 interspaced by a plurality of capacitor support platforms 186 in the manner systematically suggested by FIG. 3A.

The space between the inner tube 184 and the outer shorter tubes 182 is filled with a compound, such as $SF_6$ epoxy foam, to prevent surface condensation or the entrance of moisture that would impair the dielectric strength of the assembly.

The end flanges 194 and 196 project out of the outside radius of the tube segments 182. The total combined length of the outside tube segments 182 is made shorter than the inner tube 184, and compression springs 204 exert pressure between the flange 194 and the top of the last porcelain tube 182. This arrangement puts the porcelain segments 182 under compression and the inner tube 184 under tension, thus giving rigidity to the entire assembly and at the same time allowing for unequal thermal expansion.

FIG. 3 also illustrates the manner in which the power rods 66 and 148 are protectively housed within the hollow interior 188 of insulating column 178 and the manner in which the rods pass through the flanges 194 and 196, respectively, into the ground housing 180 at one end thereof and into the signal and transition stage 176 at the other end thereof. Specifically, associated with each of the power rods 68 and 148 and at both ends of each rod, outside of the respective flanges 194 and 196, are individual bellows units 206, 208, 210 and 212. As shown in detail for the unit 212, each of the bellows units is sealed at one end (214) to the respective rod (68) and at the other end to a cylindrical jacket (216) which is rigidly positioned in an associated aperture in the flange (194). The diameter of the power rod is slightly less than the inside diameter of the cylindrical jacket 216, whereby such power rod is free to slide.

It will be appreciated that the bellows arrangement described performs a dual function. First of all it performs the obvious function of maintaining the sealed integrity of the interior 188 of the column 178, while permitting the longitudinal displacement of the power rods therethrough. Secondly, it should be apparent that because of the slight difference in diameters of the rod and associated cylindrical jacket, a certain amount of compressed gas will escape the confines of the interior 188 into each of the bellows. Considering for example by-pass power rod 68, it will be apparent that such compressed gas in building up pressure against the interior of the bellows 210 and 212 will exert equal and opposite forces on the rod 68. Since the forces generated at each end of the power rod will be equal and opposite, they will have no net effect upon the transmission of power by the rod between the ground level operating mechanism and the platform level switch responsive thereto. However, these forces will always maintain the respective rods in tension at all times, thereby counterbalancing any possible tendency that such rods may have to buckle when they are being utilized as conveyor of compressive force rather than the conveyor of tension forces.

Also, and in a manner to be disclosed immediately below, the insulator column 178 protectively houses the various signal rods, such as 92, 104, and 124, which are used to transmit information between platform and ground level.

SIGNALLING MEANS BETWEEN HIGH VOLTAGE PLATFORM AND GROUND POTENTIAL

As suggested previously, one aspect of the instant invention makes possible the transmission of information between platform potential and ground level, whereby necessary steps can be initiated at ground level to begin various warning, by-pass, and or lock-out operations. FIG. 3 illustrates a preferred embodiment for implementing such a signalling system, it being understood that although only one such signalling arrangement is illustrated, a plurality of such arrangements would be provided in accordance with the number of signals being transmitted between platform and ground. Thus, for the system described in FIG. 1, three such arrangements would be necessary in order to provide a warning signal, a by-pass signal and a lock-out signal. For ease of illustration, FIG. 3 will be described with respect to the by-pass signal.

Signal and transition compartment 176 is interposed between the insulating column 178 and the by-pass and/or lock-out tube 170. Signal and transition compartment 176 is defined by a concentric cylinder 218 secured at one end to the lower flange 174 of the by-pass-lockout tube 170 and secured at the other end to a ring 220 interposed between the compression springs 204 and the uppermost porcelain tube 182. Extending between the flange 194 and the top end of the signal compartment 176 is a support post 222, which supports a platform 224, outstanding therefrom. Secured to and depending from the platform 224 is the by-pass relay 90 which includes a generally E-shaped core 91 and an energizing coil 93, which is inserted in series between the line 52 in FIG. 1 and the various contacts 86A, 88A, 110A, and 114A, which are in turn connected to the line 50 in FIG. 1. Associated with the core 91 is a movable armature 95, which in turn is connected to the by-pass signal rod 92 by means of a link 97. The signal rod 92 passes through the interior 188 of the insulating column 178, emerges at the other end within the enclosure 180, and is connected in turn to the double pole switch 99 which comprises the normally open contact pair 90A and the normally closed contact 90B. With the coil 93 non-energized, the return spring 101 normally biases the signal rod 92 and armature 95 downwardly such that the contacts 90A and 90B remain in the normally open and normally closed position, respectively. Upon the occurrence of the various faults, as described earlier, such that coil 93 becomes energized, the armature 95, link 97 and signal rod 92 is drawn upwardly against the bias of spring 101 such that contact 90A closes while contact 90B opens to initiate the by-pass operation in the manner explained previously.

It may be pointed out that bellows 226 and 228 cooperate with respective ends of the signalling rod 92 and with cylindrical jackets 230 and 232, respectively, in the same manner that the various bellows 206, 208, 210 and 212 cooperate with the power rods 68 and 148. Thus, compressed gas from the hollow interior 188 of the insulating column 178 escapes into the bellows 226 and 228 to exert equal and opposite tensile forces on the signalling rod 92 to maintain it in tension at all times to counteract any possible buckling effect. Simultaneously, such equal and opposite forces will have no effect and in no way interfere with the operation of the signalling rod effectuated by either the return spring 101 or activation of the coil 93.

BY-PASS AND/OR LOCK-OUT SWITCH

Turning to FIGS. 4–7, there is shown in detail a preferred embodiment of the by-pass and lock-out switch mechanism utilized in the protective system of the instant invention. As mentioned previously, the various switch components to be described are enclosed in a round insulating tube 170 of plastic material terminated at both ends in flat metallic flanges 172 and 174 that serve as connection terminals and simultaneously provide hermetic seals at both ends of the tube. Preferably, the inside of the tube is filled with an insulating gas such as $SF_6$ maintained under pressure which, as will be explained in greater detail, assures that the by-pass switch contacts will be closed in the event that there is a failure in the protective system. The two flanges 172 and 174 are held against the insulating tube 170 by means of filament rods such as 234 and 236 screw-threaded externally of the tube 170, shown, for example, at 238.

As best shown by FIGS. 3 and 6, an inflatable gasket 240 is used to guarantee the seal between the tube 170 and the lower flange 174. This inflatable gasket 240 is supplied with compressed gas by a thin conduit 242, which communicates with the hollow interior 188 of the multi-purpose insulating column 178 through a termination fitting 192 in the same manner that the conduits 32 and 32A communicate with the interior 188 through their respective termination fittings. Thus another function of the gas under pressure within the insulating column 178 is to aid in sealing the tube 170.

Insulatively supported within tube 170, by means of support posts such as 244, are metallic platforms which, among other things, support a plurality of by-pass make contacts 62M and a plurality of by-pass reinsert contacts 62R in a manner to be further described. It is to be understood that although the by-pass and lock-out switches will be described with respect to three breaks per switch, this specific disclosure is for ease of explanation only and is in no way intended to limit such by-pass construction to only three breaks, as it will become apparent that more or less breaks per switch can be used if desired. In this connotation, a break is intended to mean at least one set of by-pass make contact 62M in electrical parallel with at least one set of cooperating reinsert break contacts 62R. However, in the instant disclosure, and with reference to FIG. 5A, the instant invention utilizes two make contacts 62M in parallel with each break contact 62R. Regardless of the number of breaks utilized, a voltage divider network comprising resistors 248 of high ohmic value, is established in parallel with each of the breaks of the switch in order to evenly distribute the total potential difference existing between terminals 172 and 174 across the number of breaks being utilized.

Beginning with the by-pass power rod 68, and with reference to FIG. 3, the rod 68 sealingly but slidingly enters the tube 170 by means of the corporation established by bellows 250 and cylindrical jacket 252. Once within the tube 170, the by-pass power rod 68 is secured to a generally E-shaped crossbar 254 schematically illustrated in FIG. 7 and shown in detail in FIGS. 4, 5C and 6.

Cross piece 254 has secured to its outstanding arms, rods 256 and 258 which operate each string of make contacts 62M in a manner to be further described. The central leg of the crossbar 254 includes a pair of forked struts 260 (see FIG. 5C) at one end rigidly secured to a pedestal support 262, and at the opposite end bearing elongated slots 264 which slidably contain a pin 266 which is carried by an aperture through a lever arm 268.

Lever arm 268 is pivoted at one end 270 to an anchor 272 depending from the platform 246. At the other end 274, the lever arm 268, is linked to a connection rod 276 and to one leg 278 of a latch arrangement 280, the function of which will be explained in greater detail.

As must be apparent from the terminology, the function of the reinsert contacts 62R is to open the by-pass switch, and thereby reinsert the capacitor bank 12, once the various abnormalities associated with the by-pass protective scheme have subsided. Since such reinsertion contact 62R will be opening upon a circuit carrying the line current, means must be provided to extinguish any arc drawn during the insertion process. To this end, each of the reinsertion contacts 62R preferably comprises a vacuum type of interrupter switch including an evacuated chamber 282 within which is situated a fixed contact 284 and a movable contact 286 which is slidable through the lower end wall of the containers 282. The evacuated integrity of the containers 282 is assured by means of bellows arrangements 290 one end of which is secured to the movable contact 286 and the opposite ends of which are sealed to the interior surface of the lower end wall of the container 282.

As noted previously, the interior of tube 170 is filled with gas under pressure. Thus, in the event of failure of power rod 68, or indeed the failure of any other mechanism, the gas under pressure with the tube 170 will always exert force on the interior of the bellows 290, such that movable contact will always move to its closed circuit condition, illustrated in FIG. 6. This adds a "failsafe" characteristic to the by-pass system.

Beginning with the lowermost reinsert contact 62R, shown in FIG. 6, movable contact 286 issues through the support plate 246 and is secured to an intermediate point 292 on the lever arm 268 and also to a piston-like structure 294 which is slidably movable within a hollow cylindrical sleeve 296, the far end of which is clamped to an upstanding terminal pad 298 of the flange 174 by means of circumscribing band 300. Garter spring 302 at the other end of sleeve 296 ensures firm electrical contact between the piston-like structure 294 and the sleeve 296. The stationary contact 284, upon exiting from the container 282, is rigidly secured within a second conductive sleeve 304 by means of band 306. The hollow interior of sleeve 304 slidably receives piston-like structure 308, which in turn is connected to movable contact 286–2 of the second break contacts 62R. Movable contact 286–2 is also connected at a point 310 to a second lever arm 312 which is pivoted at end 314 to a second anchor depending from the second support platform 246–2.

The opposite end 318 of lever arm 312 is pivotally secured to the connection rod 276, such that rotation of the lowermost lever arm 268 about pivot point 270 by the power rod 268 (in a manner to be further described) not only retracts lowermost contact 268 but also through the connection rod 276 and lever arm 312, retracts movable contact 286–2 thereby interrupting the flow of current in the second break contact 62R as well as in the first. See also FIG. 7.

Although not specifically shown in FIG. 6 or 7, it will be appreciated from FIG. 4 that a similar interconnection is established with the uppermost break contacts 62R shown in FIG. 4, and would be established with any such number of break contacts being used between the terminals 172 and 174. The essential function performed by the interconnecting structure is to simultaneously open the series connected break contacts 62R such that the capacitor bank will be reinserted.

Turning now to the two strings of make contacts 62M, located (as shown in FIG. 5A) on opposite sides of the associated break contacts 62R; as the terminology suggests, the make contacts 62M are utilized to initially establish a by-pass circuit about the capacitor bank 12 when a fault has been detected. Since completing a circuit, rather than interrupting one is their function, no elaborate arc interruption system (such as the vacuum type of arc contacts provided by 62R) need be provided. Instead a novel spring plunger type of arrangement, to be described in greater detail, is provided to initially carry any pre-strike arc which would otherwise exist between the mating surfaces of the make contacts 62M, thereby materially protecting these current-carrying surfaces from erosion.

As best shown in FIGS. 4 and 5B, each make contact 62M comprises a first conductive tubular member 320 supported by and electrically connected to a respective conductive support platform 246 and a second tubular conductive sleeve 322, electrically connected to and supported from either a support platform or from conductive plate 324 in the case of the uppermost make contact 62M, which in turn is electrically connected through a conductive protrusion 326 and a conductive sleeve 328 to a depending conductive protrusion 330 of the end flange 172.

In each make contact 62M, the uppermost cylindrical sleeve 322 functions as a stationary contact while a conductive slide 332 movable within the conductive sleeve 320 functions as a movable contact (see FIG. 5B). Actually even the stationary contact structure 322 includes a cylindrical plunger portion 334 which is continuously biased downwardly by internally located springs 336. The conductive slides 332 are all rigidly secured to rods 256 and 258, respectively, which as pointed out previously are secured to cross piece 254 which, in turn, moves vertically up and down in response to the movement of by-pass power rod 68.

In operation, upward movement of rod 256 and 258 moves the conductive slide 332 upward until it engages the conductive plunger 334 (and any pre-strike arc is carried by the tips of these two cooperating members). Finally, conductive slide 332 enters stationary conductor sleeve 322 to complete the make operation. On the downward sweep of rods 256 and 258, the sequence is reversed. Garter springs 338 assure firm electrical contact between the moving parts.

It will be appreciated that since all make contacts 62M are operated by rods 256 and 258 which are joined to one another through the cross piece 254, then the making operation simulates the closing of a single contact, such as was schematically illustrated at 62 in FIGS. 1 and 2A between the terminals 172 and 174. Similarly, as mentioned earlier, all of the break contacts 62R may be effectively treated as the opening of the contact 62 in the schematics of FIGS. 1 and 2A. The reason for the separate make and break contacts to perform the by-pass and reinsert operation is, as was suggested earlier, the need for arcing contacts upon a reinsertion cycle and the desire of pre-strike contacts during a by-pass operation. Thus, it will be appreciated that means must be provided to interrelate the make and break contacts illustrated in FIGS. 4–7, such that during a reinsert operation, the make contact 62M separate first, leaving the break contacts 62R with their attendant vacuum interruption process to open last and interrupt any arc which may persist. Similarly, in a by-pass operation, the interrelationship must be such that the make contacts with their pre-strike plunger arrangement make first, followed by the closing of the break contacts 62R. This sequence of operation is in fact guaranteed by the interrelationship of the make and break contacts 62M and 62R, respectively, established by the cross piece 254 in the following manner:

Assuming the capacitor bank 12 to be by-passed such that make contacts 62M and break contacts 62R are all in their closed circuit condition (FIG. 4), and further assuming that the particular fault which caused the initial by-pass has subsided, it will be recalled that a signal will be sent from the platform to ground by the by-pass signal rod 92, which, in turn will cause the energization of the insert trip coil 76, which, in turn, will permit the release of by-pass stored energy mechanism 66. The released springs thereof rotate arm 78 causing a downward pull on the by-pass power rod 68.

As best seen in FIGS. 6 and 7, downward motion of power rod 68 will *immediately* pull rods 256 and 258 downward, thereby initiating the opening of the make contacts 62M in the manner previously described with respect to FIG. 5B. However, since the pin 266 is carried in elongated slots 264 of the forked struts 260, the initial downward movement of the cross piece 254 will have no effect upon the movable contacts 286 of the break contacts 62R. Thus the first step in an insert operation would be the opening of the make contact 62M. Finally, when the center struts 260 of the cross piece 254 are sufficiently lowered such that the pin 266 engages the uppermost portion 340 of the slot 264, then the lever arm 268 (and the other lever arms such as 312) will begin to rotate counterclockwise in FIG. 6 to initiate the opening of the break contacts 62R.

In the by-pass operation the sequence is just the opposite. Assuming an abnormality has been detected on the line, the signal conveyed to the ground, and by-pass operating mechanism released; the power rod 68 would be lifted vertically through the insulating column 178 and signal and transition chamber 176. Consequently, the cross piece 254 and the rods 256 and 258 would be simultaneously lifted to initially cause the closing of the make contacts 62M, as was described in FIG. 5B. Only after the pin 266 was reached by the lower end 342 of the slot 264 would the break contacts 62R close.

Lock-out mechanism shown in FIGS. 4–7 is similar to the by-pass mechanism described above. That is, the lock-out power rod 148 issues through bellows 344 and cylindrical jacket 346 (see FIG. 3) into the tube 170 of the by-pass lock-out housing, where it is rigidly connected to a cross piece 348, best seen in FIG. 5D. The cross piece 348 has secured thereto operating rods 350 and 352 which operate two strings, of three each, lock-out shunt contacts 150LO (shown only in FIGS. 4 and 5A). Lock-out shunt contacts operate in exactly the manner described for the by-pass make contacts 62M and include the pre-strike plunger arrangement illustrated in FIG. 5B. Hence a detailed repetitive description is thought unnecessary. The two strings of lock-out contacts 150LO function simultaneously under the direction of the lock-out power rod 148, it is the equivalent of the schematic representation of lock-out switch contact 150 in FIGS. 1 and 2A interposed between the terminals 172 and 174.

As noted previously, lock-out operation normally occurs only when the particular fault which initially caused a by-pass operation has not subsided within a predetermined time interval. It is apparent therefore that the sequence of operation, starting from a normal line current will be: detection of an abnormality, a by-pass operation (initiating closing of the make contacts 62M and the closing of break contacts 62R, in that order); and then if the fault does not subside within the prescribed interval, the lock-out operation which brings about the closing of contact 150LO. As the instant invention uses only one set of vacuum interrupter switches, 62R, it is crucial that in the reinsertion operation following both a by-pass and lock-out, lock-out contacts 150LO open before the by-pass contacts 62M and 62R. If the by-pass contact 62M and 62R should open before the lock-out contacts 150LO, there will be no means to extinguish an arc which may be drawn between the cooperating contact surfaces of the lock-out contacts.

The latch mechanism 280, previously referred to, performs this function of assuring the proper sequence of this operation when there has been a by-pass and lock-out. Specifically, and with reference to FIGS. 6 and 7, wherein both the by-pass and lock-out contacts are shown in their closed circuit condition, it will be seen that a second leg 354 of the latch arrangement 280 bears against the center portion 356 of the bifurcated cross piece 348. Thus, until the lock-out contacts 150LO have been opened by the downward pull of the rods 350 and 352 generated by the downward pull of the lock-out power rod 148, the latch mechanism 280 cannot rotate about pivot point 358 and consequently neither the lever arm 268 nor the connection rod 276 can be moved. Thus, the operator must first open the lock-out contacts before he can open the by-pass contacts and as such the vacuum interrupters 62R will always be available for circuit interruption.

It will be appreciated that the by-pass and lock-out switches herein described are extremely quick-acting because of the quick make and break capabilities made possible by a short stroke push-pull power rod. This operation is to be contrasted with the use of large, high interior, and therefore slow disconnect switches which have been suggested in the prior art.

Although there has been described a preferred embodiment of the novel invention, many variations and modifications will now be apparent to those skilled in the art. Therefore, this invention is to be limited, not by the specific disclosure herein, but only by the appended claims.

The embodiments of the invention in which an exclusive privilege or property is claimed are defined as follows:

1. In combination:
capacitor means for neutralizing the conductance of an alternating current transmission line, said capacitive means being situated on a platform support means insulated from ground having a platform potential approximately equal to the line voltage of said transmission line;
normally open circuited spark gap means in parallel with said capactive means, said spark gap means designed to instantaneously arc over and establish a low impedance parallel arc path around said capacitive means upon the occurrence of a predetermined fault voltage across said capacitive means, which fault voltage is proportional to a predetermined fault current far in excess of the normal rating of said capacitive means, and to maintain said low impedance parallel arc path around said capacitive means until extinguished under conditions specified below; and
extinguishing means for extinguishing said arc in response to the return of current in said line to predetermined acceptable values; said extinguishing means including some elements at platform potential and other elements at ground potential thereby permitting inspection and maintenance of said other elements without fear of harm, even when said transmission line is energized.

2. The combination of claim 1, and further including means insulatingly interconnecting preselected ones of said some of said elements with preselected ones of said other of said elements.

3. The combination of claim 2 wherein said extinguishing means includes:
storage means situated on said platform means for storing compressed gas used to extinguish said arc;
compressor means at ground potential for compressing gas; and
said means for insulatingly interconnecting includes conduit means insulatingly communicating with said compressor means at ground potential and said storage means at platform potential for transferring compressed gas from said compressor to said storage means.

4. In combination:
capacitor means for neutralizing the conductance of an alternating current transmission line, said capacitive means being situated on a platform support means insulated from ground having a platform potential approximately equal to the line voltage of said transmission line;
normally open circuited spark gap means in parallel with said capacitive means, said spark gap means designed to instantaneously arc over and establish a low impedance parallel path around said capacitive means upon the occurrence of a predetermined fault voltage across said capacitive means, which fault voltage is proportional to a predetermined fault current far in excess of the normal rating of said capacitive means;
extinguishing means for extinguishing said arc when the current in said line has returned to predetermined acceptable values; said extinguishing means including some elements at platform potential and other elements at ground potential;
means insulatingly interconnecting preselected ones of said some of said elements with preselected ones of said other of said elements;
wherein said extinguishing means includes storage means situated on said platform means for storing compressed gas used to extinguish said arc and compressor means at ground potential for compressing gas;
said means for insulatingly interconnecting including conduit means insulatingly communicating with said compressor means at ground potential and said storage means at platform potential for transferring compressed gas from said compressor to said storage means;
normally open switch means at platform potential operable to a closed circuit position for establishing a parallel electrical path around said capacitive means and spark gap means;
switch operating mechanism at ground potential for operating said switch means;
power transmitting means insulatively interconnecting said switch means and operating mechanism whereby the operation of said switch operating mechanism effectuates operation of said switch means;

arc current sensing control means at platform potential for effectuating release of said compressed gas in said storage means to extinguish said arc if said line current has returned to predetermined acceptable values in a predetermined length of time and for generating a command signal at platform potential if said line current has not returned to said acceptable values within said predetermined length of time; and signalling means responsive to said command signal for insulatively communicating said command signal developed at platform potential to said operating mechanism at ground potential;

thereby effectuating closing of said switch means if said line current does not return to said acceptable values within said predetermined length of time.

5. The combination of claim 4, and further including voltage divider means connected between said transmission line and ground for providing platform level potential at one end of said voltage divider means to operate said arc sensing control means and said signalling means, and for providing ground level potential at its other end to operate said compressor and operating mechanism.

6. The combination of claim 5, wherein said voltage divider means comprises a plurality of capacitors in electrical series between said line and ground, one of said capacitors nearest said line providing said platform level potential, and one of said capacitors nearest ground level providing said ground level potential.

7. The combination of claim 4, and further including hollow insulative protective means housing a portion of said power means and a portion of said signalling means, said hollow insulative protective means constituting a portion of said conduit means between said compressor means and storage means.

8. The combination of claim 7, and further including voltage divider means connected between said transmission line and ground, said voltage divider means providing platform potential at one end to operate said arc current sensing control means and providing ground level potential at its other end to operate said switch operating means and compressor means; said voltage divider means comprising a plurality of capacitors in electrical series between said line and ground, one of said capacitors nearest said line providing said platform level potential, and one of said capacitors nearest ground level providing said ground level potential; said hollow insulative protective means comprising a plurality of modular hollow insulative sections separatingly stacked upon one another by a plurality of outstanding flanges, each one of which supports one of said capacitors.

9. The combination of claim 7, wherein said hollow insulative protective means is closed at both ends by sealing means, and the interior of said hollow insulative protective means is filled with compressed gas to better insulate said interior against the potential difference existing between said platform support means and ground; and further including first piping means sealingly communicating with said compressor means and one end of said interior, and second piping means communicating with said other end of said interior and said storage means; said interior joining said first and second piping means constituting said portion of said conduit means.

10. The combination of claim 9, wherein said portion of said power means is a first rod, and said portion of said signalling means is a second rod; said first and second rods slidably passing through the sealing means at both ends of said hollow insulative protective means; and further including bellows means at each end of said protective means cooperating with a respective one of said sealing means and an end of said rods for preventing the escape of said compressed gas from said interior while still permitting slidable movement of said rods.

11. The combination of claim 10, wherein a first end of the bellows means at each end of said protective means is sealingly and rigidly joined to said respective end of said rods and a second end of said bellows means is sealingly and rigidly joined to said respective sealing means on the respective end of said protective means; the interior of the respective bellows means communicating with the interior of said hollow protective means whereby the compressed gas in said interior will generate equal and opposite forces on said respective bellows such that equal and opposite forces will be applied to said rods to constantly maintain them under tension.

12. The combination of claim 11, and further including voltage divider means connected between said transmission line and ground, said voltage divider means providing platform potential at one end to operate said arc sensing control means and providing ground level potential at its other end to operate said switch operating means and compressor means; said voltage divider means comprising a plurality of capacitors in electrical series between said line and ground, one of said capacitors nearest said line providing said platform level potential, and one of said capacitors nearest ground level providing said ground level potential; said hollow insulative protective means comprising a plurality of modular hollow insulative sections separatingly stacked upon one another by a plurality of outstanding flanges, each one of which supports one of said capacitors.

13. In combination:

capacitive means for neutralizing the conductance of an alternating current transmission line, said capacitive means being situated on a platform support means insulated from ground having a platform potential approximately equal to the line voltage of said transmission line;

information transmission control means operable at platform potential for generating information signals in response to the occurrence of predetermined conditions;

information signalling means responsive to said information signals for insulatingly transferring said information signals to preselected ground level mechanism;

wherein said preselected ground level mechanism is dependent upon ground level potential for its operation;

and further including voltage divider means connected between said transmission line and ground, said voltage divider means providing platform potential at one end to operate said information transmission control means and providing ground level potential at its other end to operate said preselected ground mechanism.

14. The combination of claim 13, wherein said information singalling means includes:

normally non-energized coil means energized in response to the reception of said information signals;

armature means cooperating with said coil means and moved from a first position to a second position in response to energization of said coil means;

insulative coupling means joined to said armature means at one end and to said preselected ground level mechanism at its other end;

whereby information generated at platform potential can be instantaneously transferred to said ground level mechanism.

15. In combination:

capacitive means for neutralizing the conductance of an alternating current transmission line, said capacitive means being situated on a platform support means insulated from ground having a platform potential approximately equal to the line voltage of said transmission line;

first means including some elements at platform potential for taking said capacitive means out of said transmission line in response to the occurrence of predetermined conditions;

second means including some elements at platform potential and other elements at ground potential for reinserting said capacitive means in said transmission line in response to the subsistance of said conditions;

voltage divider means connected between said transmission line and ground for providing platform level potential at one end of said voltage divider means, and for providing ground level potential at its other end.

16. The combination of claim 15, and further including:

third means for insulatingly interconnecting preselected ones of said some elements of said second means which are at platform potential with preselected ones of said other elements of said second means which are at ground potential;

whereby said other elements of said second means are always in proper operating cooperative relationship with respect to their cooperating some elements at platform potential, and yet said other elements can be inspected and maintained without fear of harm even when said transmission line is energized.

17. The combination of claim 15, wherein said first means includes other elements at ground potential, and further including:

third means for insulatingly interconnecting preselected ones of said some elements of said first and second means which are at platform potential with preselected one of said other elements of said first and second means which are at ground potential;

whereby said other elements at ground potential of said first and second means can be inspected and maintained without fear of harm even when said transmission line is energized;

wherein said first means includes:

switch means at platform potential for establishing a parallel path about said capacitive means;

operating mechanism at ground potential for operating said switch means;

control means at platform potential for detecting the existence of predetermined conditions in said line and generating by-pass command signals in response thereto; and said third means includes:

insulative power transmitting means connecting said operating mechanism to said switch means; and insulative signalling means responsive to said by-pass command signals for communicating said by-pass command signals to said operating mechanism.

References Cited

UNITED STATES PATENTS

| 2,949,567 | 8/1960 | Johnson | 317—12 |
| 3,227,925 | 1/1966 | Cook | 317—58 |
| 3,249,812 | 5/1966 | Price | 317—12 |
| 3,452,251 | 6/1969 | Jensen | 317—12 |

JAMES D. TRAMMELL, Primary Examiner

U.S. Cl. X.R.

200—146; 317—59